(12) United States Patent
Yang et al.

(10) Patent No.: US 8,420,202 B2
(45) Date of Patent: Apr. 16, 2013

(54) STAB AND BALLISTIC RESISTANT MATERIAL AND METHOD FOR PREPARING THE SAME

(75) Inventors: Nianci Yang, Linli (CN); Zhiquan Wu, Linli (CN); Mingquing Lin, Linli (CN); Chuanquing Wu, Linli (CN); Bo Gao, Linli (CN); Yunbo Zhou, Linli (CN); Haijun Lin, Linli (CN); Yuanjun Zhang, Linli (CN); Wanqi Zhou, Linli (CN); Yong Guo, Linli (CN)

(73) Assignee: Hunan Zhongtal Special Equipment Co., Ltd., Linli (CN)

( * ) Notice: Subject to any disclaimer, the term of this patent is extended or adjusted under 35 U.S.C. 154(b) by 315 days.

(21) Appl. No.: 12/811,135

(22) PCT Filed: May 20, 2010

(86) PCT No.: PCT/CN2010/000721
§ 371 (c)(1),
(2), (4) Date: Jun. 29, 2010

(87) PCT Pub. No.: WO2011/069320
PCT Pub. Date: Jun. 16, 2011

(65) Prior Publication Data
US 2011/0256339 A1     Oct. 20, 2011

(30) Foreign Application Priority Data
Dec. 9, 2009 (CN) ............ 2009 1 0250240

(51) Int. Cl.
*B32B 5/12* (2006.01)
*B32B 38/04* (2006.01)

(52) U.S. Cl.
USPC ........... 428/113; 428/105; 428/107; 428/135; 428/213; 428/364

(58) Field of Classification Search .............. 428/113, 428/107, 213, 364, 105; 442/135
See application file for complete search history.

(56) References Cited

U.S. PATENT DOCUMENTS

| 5,472,769 A | 12/1995 | Goerz et al. |
| 5,736,474 A | 4/1998 | Thomas |

(Continued)

FOREIGN PATENT DOCUMENTS

| CN | 1201900 A | 12/1998 |
| CN | 1429148 A | 7/2003 |

(Continued)

OTHER PUBLICATIONS

Shin, "Cut Resistance of High-strength Yarns," Aug. 2006; Textile Research Journal, vol. 76(8); Pro-Quest Science Journals; SAGE Publications.

(Continued)

*Primary Examiner* — Brent O'Hern
(74) *Attorney, Agent, or Firm* — Kinney and Lange, P.A.

(57) ABSTRACT

A stab and ballistic resistant material and method of preparing the same, comprising a stab-resistant layer and a ballistic resistant layer, wherein the stab-resistant layer comprises at least one layer, wherein each layer is constituted of two structural units, each of which is formed from perpendicularly combined high strength and high module unidirectional fiber prepreg strips, adjacent structural units are rotated 45°, and the stab-resistant layer has membranes adhered to both sides; the ballistic resistant layer comprises at least one layer, wherein each layer is constituted of two structural units, each of which is formed from perpendicularly combined unidirectional fiber prepreg strips, adjacent structural units are rotated 90°, and the ballistic resistant layer has membranes adhered to both sides. The stab and ballistic resistant material of the invention makes stab and ballistic resistant vests lighter, more efficient in protection, and easy to produce.

8 Claims, 2 Drawing Sheets

U.S. PATENT DOCUMENTS

| | | | |
|---|---|---|---|
| 6,000,055 A * | 12/1999 | Citterio | 2/2.5 |
| 6,280,546 B1 | 8/2001 | Holland et al. | |
| 6,475,936 B1 | 11/2002 | Chiou | |
| 6,586,351 B1 | 7/2003 | Breukers | |
| 7,601,416 B2 | 10/2009 | Palley | |
| 2004/0048536 A1 | 3/2004 | Granqvist et al. | |
| 2006/0135022 A1* | 6/2006 | Porter | 442/381 |
| 2007/0173150 A1 | 7/2007 | Bhatnagar et al. | |
| 2008/0241494 A1 | 10/2008 | Ardiff et al. | |
| 2008/0306214 A1 | 12/2008 | Kanderski | |

FOREIGN PATENT DOCUMENTS

| | | |
|---|---|---|
| CN | 1537988 A | 10/2004 |
| CN | 101228310 A | 7/2008 |
| CN | 101479556 A | 7/2009 |
| FR | 1311875 A | 12/1962 |
| WO | WO00/64663 | 4/2000 |
| WO | 0207347 A1 | 1/2002 |
| WO | 2007005043 A2 | 1/2007 |
| WO | 2004084104 A2 | 7/2007 |
| WO | 2008137218 A1 | 11/2008 |

OTHER PUBLICATIONS

Kiho Joo, et al, "Numerical Analysis of Energy Absorption Mechanism in Multi-ply Fabric Impacts," Textile Research Journal vol. 78(7) 2008.

Official International Search Report and Written Opinion of the Patent Cooperation Treaty Office in counterpart foreign application No. PCT/CN1010/000721, filed May 20, 2010.

Examination and Search Report of the SIPO for Chinese application No. 200910250240.6, dated Aug. 31, 2012.

Extended European Search Report in Application No. 10790338.7, dated Jun. 25, 2012.

English translation of the Israeli Ministry of Justice Patent Office examination report in corresponding foreign application No. 209202, dated Dec. 10, 2012.

* cited by examiner

STAB AND BALLISTIC RESISTANT MATERIAL AND METHOD FOR PREPARING THE SAME

FIELD OF THE INVENTION

The invention relates to a soft stab and ballistic resistant material.

The invention also relates to a method for making the above soft stab and ballistic resistant material.

BACKGROUND OF THE ART

Ballistic attack and knife stab are the two major threats against human bodies. Usually, it is impossible for individual defenders to predict the coming threat is a ballistic attack or a knife stab. In this case, a single equipment with both stab and ballistic resistant functions is very necessary. Nevertheless, the mechanisms of stab resistance and ballistic resistance are quite different, so it is very difficult for a material to possess both of these two functions.

Some researchers have explored the penetration of P knife (see Textile Research Journal vol 76 (8) 607-613), indicating that an acuminous knife point exerts an extremely strong penetrating power and a sharp knife blade exerts an extremely strong cutting power to a material. In view of the above, investigation was carried out on the basis of the following two aspects.

1) Defense against penetration of an acuminous knife point: for example in US2004/0048536A1 and U.S. Pat. No. 6,586,351B1, a high strength fabric adhered a coating of solid rigid particles was proposed to defend knife points.

2) Defense against incision of a sharp knife blade: for instance in U.S. Pat. No. 5,472,769, U.S. Pat. No. 5,736,474A and WO2002/007347A1, a structure mixed by fabric and wire netting or a strand structure twisted from stainless steel threads was proposed to defend incision of a sharp knife blade; in U.S. Pat. No. 6,280,546, fabric with a thermoplastic membrane adhered to its surface was proposed to improve the material's ability for cut-resistance.

However the processes described above, as a whole, have poor effects, and lack of ballistic resistant function.

Dupont Co. proposed, in U.S. Pat. No. 6,475,936B1, to use a fabric loosely woven from aramid yarn with broken crow satin weave as a stab-resistant layer, and to use the plain weave fabric tightly woven from low denier aramid yarn as a ballistic resistant layer. Overlap of these two layers can achieve both stab and ballistic resistant properties, but such stab and ballistic resistant material has not been accepted by the market, due to the high cost of the weaving technique and low denier yarn.

Honeywell Int. proposed, in WO2007/084104A2, a stab-resistant layer material composed of multilayers of HSHM-PE fabric and rubber. The overlap of multilayers of Honeywell LCR UD is used as a ballistic resistant layer material. Overlap of the above two materials can achieve both stab and ballistic resistant properties. However the processing of the stab-resistant layer of such material is very difficult to be industrialized.

SUMMARY OF THE INVENTION

The purpose of the invention is to provide a soft stab and ballistic resistant material.

Another purpose of the invention is to provide a method for making the above soft stab and ballistic resistant material.

To accomplish these purposes, the soft stab and ballistic resistant material provided by the invention consists of a stab-resistant layer and a ballistic resistant layer, wherein the stab-resistant layer comprises at least one layer, wherein each layer is constituted of two structural units, each of which is formed from perpendicularly combined high strength and high module unidirectional fiber prepreg strips, and the fibers of the adjacent layers of the adjacent structural units are arranged at an angle of 45°; a membrane selected from the group consisting of high strength polypropylene membranes, polyester membranes, polyimide membranes or polyethylene terephthalate membranes is adhered to each side of the stab-resistant layer; adhesion of the membranes is performed with styrene-ethylene-ethylene-propylene-styrene polymer and maleic anhydride modified styrene-ethylene-butylene-styrene polymer as adhesive;

the ballistic resistant layer comprises at least one layer, wherein each layer is constituted of two structural units, each of which is formed from perpendicularly combined high strength and high module unidirectional fiber prepreg strips, and the fibers of the adjacent layers of the adjacent structural units are arranged at an angle of 90°; a polyethylene membrane is adhered to each side of the ballistic resistant layer; adhesion of the polyethylene membranes is performed with a solvent adhesive selected from the group consisting of styrene-ethylene-ethylene-propylene-styrene polymer, styrene-ethylene-butylene-styrene polymer and the mixture thereof; wherein said stab-resistant layer and ballistic resistant layer are located next to each other or form a sandwich structure with any other layer(s) placed between them; said other layer(s) include(s) but is (are) not limited to a high strength and high module unidirectional fiber prepreg material.

In the stab and ballistic resistant material described above, a monolayer of the high strength and high module fiber prepreg strips has an areal density no more than 40 g/m$^2$.

High strength and high module polyethylene fiber, aramid or aromatic polyester fiber is used in the invention. Among them, high strength and high module polyethylene fiber is preferred.

The high strength and high module fiber of the invention has a strength of at least 32 cN/dtex and a modulus of at least 1000 cN/dtex, preferably a strength of 35 cN/dtex and a modulus of at least 1100 cN/dtex.

The high strength biaxially oriented organic membrane adhering to each side of the inventive stab-resistant layer may be a biaxially oriented polypropylene membrane, polyester membrane, polyimide membrane or polyethylene terephthalate membrane, preferably a biaxially oriented polyester membrane; such biaxially oriented polyester membrane has a thickness of ≦15 μm, preferably ≦5 μm.

The biaxially oriented organic membrane adhering to each side of the inventive stab-resistant layer has a longitudinal and transverse tensile strength of greater than 200 and 240 MPa respectively, a longitudinal and transverse modulus of greater than 4000 and 5000 MPa respectively, and a longitudinal and transverse elongation at break of 130% and 140% respectively. For instance, in certain preferred embodiments, the biaxially oriented polyester membrane with a longitudinal and transverse tensile strength of greater than 200 and 240 MPa respectively, a longitudinal and transverse modulus of greater than 4000 and 5000 MPa respectively, and a longitudinal and transverse elongation at break of 130% and 140% respectively may be used.

The method for preparing the above stab and ballistic resistant material provided by the invention comprises the steps of:
1) preparing a lining-free unidirectional prepreg strip reeling material, wherein the high strength and high module fibers are placed on a parallel creel, the fiber bundles are dragged into an arrangement with uniform intervals by a traction engine, the high strength and high module fibers are synchronously fed into a friction roller device, the fibers carries high voltage static electricity after static friction, monofilaments in the fiber bundles repel one another to reach an evenly arranged status under the function of static electric force;
the fibers are dipped and spread and the adhesive is solidified, which keep the evenly arranged status of the high strength and high module unidirectional fibers, the lining-free unidirectional fiber prepreg strip reeling material is obtained after further dried;

2) preparing a lining-free bilayer perpendicularly laminated unidirectional fiber prepreg strip reeling material, wherein the lining-free unidirectional fiber prepreg strip reeling material prepared in step 1) is cut into square sheets, the square sheets are overlapped, adhered and combined under a pressure in the still wet area of the adhesive after the lining-free unidirectional fiber in step 1) is dipped into adhesive, while the directions of the fibers in two adjacent layers are perpendicular to each other, so as to achieve a [0°/90°] perpendicular on-line lamination, thereby obtaining the [0°/90°] lining-free bilayer perpendicularly laminated unidirectional fiber prepreg strip reeling material;

3) preparing a ballistic resistant tetralayer perpendicularly laminated unidirectional prepreg strip reeling material, wherein
the [0°/90°] lining-free bilayer perpendicularly laminated unidirectional fiber prepreg strip reeling materials obtained in step 2) are heat-laminated again while the fibers in adjacent layers are perpendicular to each other, so as to obtain the lining-free tetralayer perpendicularly laminated fiber prepreg strip reeling material, and then polyethylene membranes are adhered to both sides of the resulting reeling material, so as to obtain the ballistic resistant reeling material with a $[0°/90°]_2$ lining-free tetralayer perpendicularly laminated structure;

4) preparing a stab-resistant tetralayer crossly laminated unidirectional prepreg strip reeling material, wherein
the [0°/90°] lining-free bilayer perpendicularly laminated unidirectional fiber prepreg strip reeling material obtained in step 2) is heat-laminated (0°/90°, 45°/135°) with another [0°/90°] lining-free bilayer perpendicularly laminated unidirectional fiber prepreg strip reeling material obtained in step 2) with the crossing angle between the fibers in adjacent layers of 45°, subsequently the material is sprayed with an adhesive on both sides, and then adheres to and combined with a high strength polypropylene membrane, polyester membrane, polyimide membrane or polyethylene terephthalate membrane on each side, so as to obtain a two-unit crossly laminated material used for defending stabs and bullets; then four structural units (two two-unit crossly laminated materials) are crossly combined (0°/90°, 45°/135°, 0°/90°, 45°/135°) and are adhered to and combined with a high strength polypropylene membrane, polyester membrane, polyimide membrane or polyethylene terephthalate membrane on each side, so as to obtain a four-unit 45° crossly laminated stab and ballistic resistant material.

The fiber of the invention is high strength polyethylene fiber, aramid or aromatic polyester fiber, preferably high strength polyethylene fiber, which has a fiber strength of at least 32 cN/dtex and a module of at least 1000 cN/dtex, preferably a fiber strength of at least 35 cN/dtex and a module of at least 1100 cN/dtex.

Adhesion of the polyethylene membrane of the invention is performed with styrene-ethylene-ethylene-propylene-styrene polymer or styrene-ethylene-butylene-styrene polymer.

Adhesion of the high strength polypropylene membrane, polyester membrane, polyimide membrane or polyethylene terephthalate membrane of the invention is performed with styrene-ethylene-ethylene-propylene-styrene polymer and maleic anhydride modified styrene-ethylene-butylene-styrene polymer as adhesive.

The soft material of the invention has both stab and ballistic resistant functions. In this case, it, in cooperation with the traditional UD material (unidirectional fiber prepreg strip perpendicular composite material), may be used to produce the key material for defending stabs and bullets, thereby accomplishing the goal for preparing light stab and ballistic resistant vests.

DETAILED EMBODIMENTS

Figure 1:
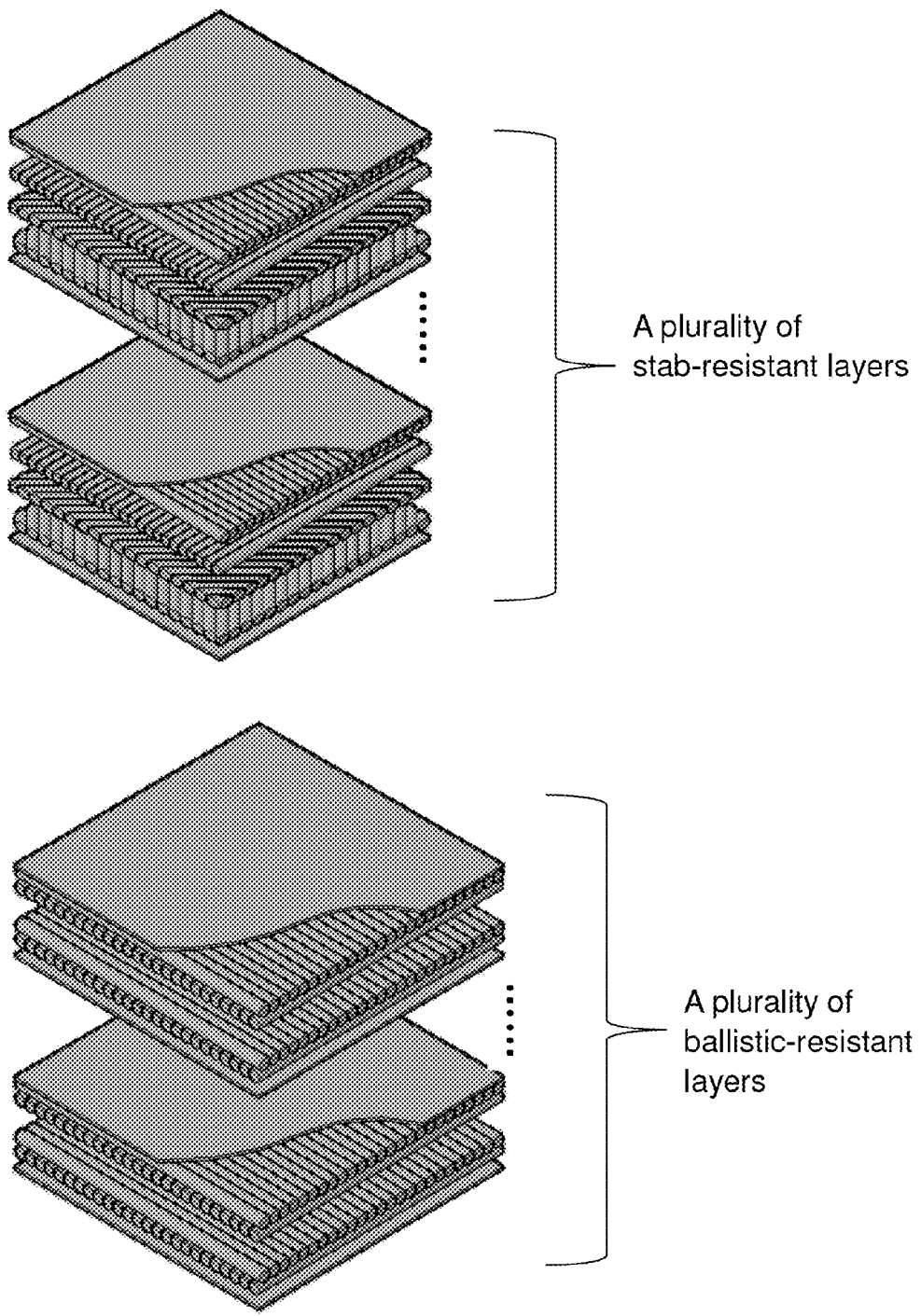
FIG. 1 illustrates schematically the structure of the stab and ballistic resistant material according to an embodiment of the present invention comprising a plurality of stab-resistant layers and a plurality of ballistic-resistant layers.
Figure 2:
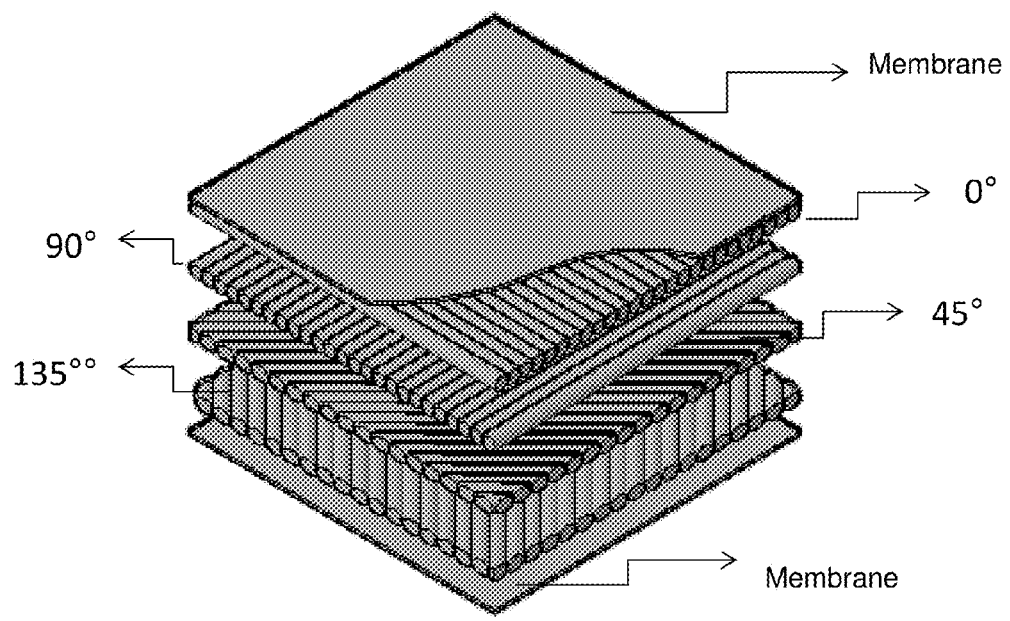
FIG. 2 illustrates schematically the structure of the stab-resistant layer of the stab and ballistic resistant material according to an embodiment of the present invention, showing the intersect angle between the orientation of fibers of adjacent strips in adjacent unit.
Figure 3:
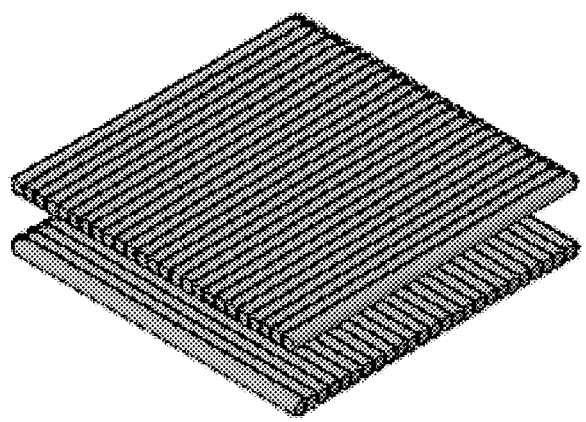
FIG. 3 illustrates schematically the structure of a structural unit of the stab and ballistic resistant material according to an embodiment of the present invention, which formed by perpendicularly combining unidirectional fiber prepreg strips.

The mechanism of the inventive material to defend bullets is shown as follows.

UD (unidirectional fiber prepreg strip perpendicular composite material) is the best ballistic resistant structure, since the material with such a structure can sufficiently utilize the high strength and high module features of fibers; absorbs kinetic energy of bullets while the fibers are broken; and rapidly delivers and disperses the blast waves of bullets due to the straight arrangement of the fibers thereof. And also, the unidirectional fiber prepreg strip perpendicular composite material of such material is subject to interlayer peeling during blasts, which results in absorption of kinetic energy of bullets. The above ballistic resistant mechanism is different from the stab-resistant mechanism, so such material, as determined by the actual tests, has poor stab resistance and does not possess an excellent stab and ballistic resistant function.

Both the fabric and UD structure are easy to be broken by an acuminous knife point. Therefore, in this invention, a high strength biaxially oriented membrane is used to improve the stab-resistant ability. However, the stab-resistant ability depending on the membrane is limited. In a control experiment (P knife is used as the stabbing knife and a unidirectional prepreg strip adhering with the membrane is used as the stabbed material), it is indicated that the breaking strength is dramatically improved especially when the high strength biaxially oriented membrane is adhered to the perpendicular composite unidirectional prepreg strip, and utilization of multilayers of the above material results in a significant impact on breaking defense. Among them, the high strength biaxially oriented polypropylene membrane, polyester membrane, polyimide membrane or polyethylene terephthalate membrane is preferred, and high strength biaxially oriented polyester membrane is the most preferred. The thickness of the membrane affects the softness of the material, which may be ≦15 μm, and preferably ≦5 μm.

According to the analysis of cutting force of a knife blade to fibers, the cutting force reaches maximum when the included angle between the fibers and the knife blade is 90°, and the cutting resistance of the fibers to the knife blade is gradually enhanced as such included angle decreases. However, during knife stabbing, the angle between the cutting blade and the cut fibers varies randomly, so it is impossible to predict such angle. In view of the above, it is disadvantageous that fibers of UD material are only arranged in two directions perpendicular to each other. On the other hand, concerning the relation between variation of the fiber directional distribution in UD material and the cutting resistance against P knife, the statistic experimental result showed that the cutting resistance against P knife increases as the included angle between fibers raises gradually from 0° to 45°. Therefore it is preferable to adjust the perpendicular arrangement of the fibers in UD material to the directional arrangement with an angle of fibers of less than 90°. From the comparison between a variety of UD fiber arrangements in which one fiber structural unit rotates 0°-45° relative to another fiber structural unit, it is found that the rotating angle between the two fiber structural units is preferably 45°. As a result, the stab-resistant layer should comprise at least one layer, wherein each layer is constituted of structural units which are formed from perpendicularly combined high strength and high module unidirectional fiber prepreg strips, and the rotating angle of the fibers on the adjacent layers between the structural units is 0°-45°, and a unit cross combination with a rotating angle of 45° is preferred. Such cross combination may occur between 2, 3 or 4 structural units, more preferably between 2 or 4 structural units. After the cross combination of structural units is accomplished, a biaxially oriented high strength membrane is adhered to the cross combination of structural units, thereby a basic structural unit form of the stab-resistant layer is obtained.

Since the fibers are still in a straight arrangement in the above new UD material, and its only difference with traditional UD material is that the included angle is adjusted to 45°, the ballistic resistant feature of UD is partially maintained (about 60%). The coordination between the above two UD materials constitutes the soft stab and ballistic resistant material of the invention.

The invention is described in detail by the following Examples, but scopes of the claims are not limited by the detailed data/embodiments. In the invention, all the portions, percentages, and ratios are based on weight and all temperatures are in centigrade scale, unless otherwise indicated.

EXAMPLE 1

Preparation of a Lining-Free Unidirectional Prepreg Strip Reeling Material

ZTX99 (~600 d (240f)) high strength and high module polyethylene fibers (HSHM-PE) (with a breaking strength of $\geq$35 cN/dtex, a module of $\geq$1100 cN/dtex, and a breaking elongation of ≈3%) were placed on a parallel creel. The fiber bundles were dragged through a reed (5 reeds/cm) into an arrangement with a uniform interval within a breadth of 1.20M by a 7-rollers traction engine, and the fibers were synchronously fed into a friction roller device. With being dragged by a posterior traction engine, the fibers carried high voltage static electricity after static friction, and monofilaments in the fiber bundles repelled one another to reach an evenly arranged status under the function of static electric force. Subsequently, the dipping roller was dipped in an adhesive (the adhesive was a solvent adhesive with a major ingredient of styrene-ethylene-butylene-styrene polymer (SEBS), styrene-ethylene-ethylene-propylene-styrene polymer (SEEPS) or the mixture thereof, and the amount of the adhesive is 12-16%) and spread with the adhesive, so as to accomplish the quantitative uniform dipping with the adhesive. The dipped unidirectional fiber material was dried with blown air, so as to rapidly solidify the adhesive, which kept the evenly arranged status of the unidirectional fibers. Further drying process was performed to obtain the lining-free unidirectional prepreg strip reeling material (with the areal density of 37 g/m$^2$, the fiber content of 86%, and the adhesive content of about 14%).

EXAMPLE 2

Preparation of a Lining-Free Bilayer Perpendicularly Laminated Unidirectional Prepreg Strip Reeling Material The lining-free unidirectional prepreg strip reeling material obtained in Example 1 was cut into 1.20M square sheets, and kept for later use.

The procedures in Example 1 were repeated. The 1.20M square sheets were overlapped and adhered in the still wet area of the adhesive after the unidirectional fibers were dipped with the adhesive, while the directions of the fibers in two adjacent layers were perpendicular to each other. Subsequently the overlapped and adhered 1.20M square sheets were combined under a pressure in a rolling-type laminating machine so as to achieve a [0°/90°] perpendicular combination, thereby obtaining the [0°/90°] lining-free bilayer perpendicularly laminated unidirectional prepreg strip reeling material.

EXAMPLE 3

Preparation of a Ballistic Resistant Tetralayer Perpendicularly Laminated Unidirectional Prepreg Strip Reeling Material (ZT160)

The [0°/90°] lining-free bilayer perpendicularly laminated unidirectional prepreg strip reeling material obtained in Example 2 was then heat-laminated again while the fibers of the two structural units in adjacent layers were perpendicular to each other, so as to obtain the lining-free tetralayer perpendicularly laminated prepreg strip reeling material. For example, during the second heat-combination, polyethylene (PE) membranes (with a thickness of 6 μm and an areal density of 6 g/m$^2$) adhered to both sides of such material, so as to obtain the ballistic resistant reeling material with a [0°/90°]$_2$ tetralayer perpendicularly laminated structure which had an areal density of 160 g/m$^2$ and PE protective membranes adhering to its both sides (such reeling material comprised 80% fiber, 12.5% adhesive, and 7.5% membrane), and thus to be used for ballistic resistant garments.

EXAMPLE 4

Preparation of a Stab-Resistant Tetralayer Crossly Laminated Unidirectional Prepreg Strip Reeling Material (ZTC)

A lining-free bilayer perpendicularly laminated unidirectional prepreg strip reeling material was obtained by repeating Example 2, wherein such material comprised 82% fiber, 18% adhesive and constituted with the structural units which were crossly combined subsequently.

The reeling material of the above structural unit was heat-laminated with the reeling material of another structural unit while the included angle between the fibers in adjacent layers was kept as 45°. Then each side of the combined material was sprayed with 2% adhesive (a solvent adhesive with a major ingredient of SEEPS and maleic anhydride modified SEBS) and adhered to a polyester (PET) biaxially oriented membrane with a thickness of 5 μm and an areal density of 8 g/m² so as to obtain a stab and ballistic resistant material (ZTC-2) in which two structural units were crossly combined at 45° (0°/90°, 45°/135°) and a PET membrane was adhered to each of both sides. Four structural units (0°/90°, 45°/135°, 0°/90°, 45°/135°) were crossly combined, and adhered to and is combined with PET membranes on both sides, so as to obtain a four-unit 45° crossly laminated stab and ballistic resistant material (ZTC-4) which adhered with PET membranes on both sides, and thus to be used for ballistic resistant garments.

EXAMPLE 5

The Stab Resistant Feature of the Stab Resistant Material ZTC-2

Fifty-two layers of ZTC-2 material were overlapped together to form a target sample with areal density of 8.95 kg/m². A stab resistance test was carried out with P knife according to Standard GA68-2008 (24J). Three tests were performed at room temperature, which showed that 6 layers in the target sample were not penetrated in all these tests. Two tests were performed immediately after the target sample was kept at 55° C. for 4 hr, one of which showed that 3 layers were not penetrated, and the other test showed that the result is critical.

COMPARATIVE EXAMPLE 1

The stab resistant feature of a stab resistant material with a $[0°/90°]_2$ structure (i.e., a structure obtained by laminating two [0°/90°] units) and 5 μm PET membranes on both sides.

Fifty-four layers of the $[0°/90°]_2$ structure with PET membranes on both sides were overlapped to form a target sample with areal density of 9.38 kg/m². A stab resistance test was carried out with P knife according to Standard GA68-2008 (24J). Three tests were performed at room temperature, which showed that 5 layers in the target sample were not penetrated in all these tests.

COMPARATIVE EXAMPLE 2

The stab resistant feature of a stab resistant material with a $[0°/90°]_2$ structure (i.e., a structure obtained by laminating two [0°/90°] structural units) and 5 μm PET membranes on both sides.

Eighty-four layers of the ballistic resistant material ZT161 with a monolayer areal density 135 g/m² were overlapped to form a target sample with areal density of 11.35 kg/m². A stab resistance test was carried out with P knife according to Standard GA68-2008 (24J). One test was performed at room temperature, which showed that one of the layers was not penetrated. Three tests were performed immediately after the target sample was kept at 55° C. for 4 hr, which showed that P knife penetrated the target samples and exposed in an excess depth of 12 mm in all three tests.

EXAMPLE 6

The Stab and Ballistic Resistant Feature of the Combination of Stab Resistant Material ZTC-2 and Ballistic Resistant Material ZT160

The stab resistant material ZTC-2 and ballistic resistant material ZT160 were overlapped and cooperated, wherein the layer numbers for ZTC-2 and ZT160 were indicated in Table 1. The stab resistant material layer was used as the striking face. The stab resistance test was carried out with P knife according to Standard GA68-2008 (24J). The ballistic resistant test was carried out with 1.1 g fragment stimulate project (FSP), 51 type bullets of 54 type pistol, 51 type bullets of 79 type sub-machine gun according to Standard GJB 4300-2002 and GA141-2001. The results were shown in Table 1.

| N° | AD kg/m² | Thickness mm | Stab resistant layer ZTC-2 | Ballistic resistant layer ZT160 | Total number of layers | Stab resistant property ※ Standard: GA68-2008 | Ballistic resistant property Standard: GJB 4300-2002 Standard: GA141-2001 | |
|---|---|---|---|---|---|---|---|---|
| 6-1 | 9.128 | 12 | 46 layers | 8 layers | 54 layers | at room temperature, reaching standard; at high temperature, reaching standard | 1.1 g FSP $V_{50}$ = 668.19 m/s 54/51 (51 type bullets with 54 type pistal) $V_{50}$ = 578.0 m/s | |
| 6-2 | 9.25 | 12 | 46 layers | 8 layers | 54 layers | at room temperature, reaching standard; at high temperature, reaching standard | 54/51 (51 type bullets with 54 type pistal) 1, $V_0$ = 427 m/s(0°) 2, $V_0$ = 416.7 m/s(−30°) 3, $V_0$ = 432.3 m/s(+30°) 4, $V_0$ = 420.7 m/s(0°) 5, $V_0$ = 418.6 m/s(0°) | penetrating 19 layers penetrating 13 layers penetrating 16 layers penetrating 15 layers penetrating 16 layers |
| 6-3 | 10.96 | 16 | 43 layers | 23 layers | 66 layers | at room temperature, reaching standard; at high temperature, reaching standard | 51 type bullets of 79 type sub-machine gun 1, $V_0$ = 479.7 m/s(0°) 2, $V_0$ = 523.3 m/s(−30°) 3, $V_0$ = 492.9 m/s(+30°) 4, $V_0$ = 518.9 m/s(0°) 5, $V_0$ = 515.7 m/s(0°) 6, $V_0$ = 490.2 m/s(0°) | penetrating 26 layers penetrating 34 layers penetrating 31 layers penetrating 34 layers penetrating 33 layers penetrating 29 layers |

※The condition qualified for stab resistance standard: the test was carried out with P knife according to GA68-2008 (24J), and P knife was not allowed to penetrate the target sample whether at room temperature or at high temperature (55° C., 4 hr).

The invention claimed is:

1. A stab and ballistic resistant material, comprising a stab-resistant layer and a ballistic resistant layer, wherein
the stab-resistant layer comprises at least one layer, wherein each layer of the at least one layer is constituted of two structural units, each of the two structural units is formed from perpendicularly combined high strength and high module unidirectional fiber prepreg strips, and the fibers of adjacent layers in adjacent structural units are arranged at an angle of no higher than 45°; a biaxially oriented organic membrane is adhered to both sides of the stab-resistant layer with a solvent adhesive selected from the group consisting of styrene-ethylene-ethylene-propylene-styrene polymer and maleic anhydride modified styrene-ethylene-butylene-styrene polymer;
the ballistic resistant layer comprises at least one layer, wherein each layer of the at least one layer is constituted of two structural units, each of the two structural units is formed from perpendicularly combined high strength and high module unidirectional fiber prepreg strips, and the high strength and high module fibers of adjacent layers in adjacent structural units are arranged at an angle of 90°; a polyethylene membrane is adhered to both sides of the ballistic resistant layer with a solvent adhesive selected from the group consisting of styrene-ethylene-ethylene-propylene-styrene polymer, styrene-ethylene-butylene-styrene polymer and the mixture thereof;
wherein said stab-resistant layer and ballistic resistant layer are located next to each other or form a sandwich structure with any other layer(s) placed between them, and said high strength and high module fiber has a strength of at least 32 cN/dtex and a modulus of at least 1000 cN/dtex.

2. The stab and ballistic resistant material according to claim 1, wherein said high strength and high module fiber is polyethylene fiber, aramid or aromatic polyester fiber.

3. The stab and ballistic resistant material according to claim 1, wherein said high strength and high module fiber has a strength of 35 cN/dtex and a modulus of at least 1100 cN/dtex.

4. The stab and ballistic resistant material according to claim 1, wherein said high strength and high module fiber prepreg strips has a monolayer areal density of $\leq 40$ g/m$^2$.

5. The stab and ballistic resistant material according to claim 1, wherein said biaxially oriented organic membrane is a biaxially oriented polypropylene membrane, polyester membrane, polyimide membrane or polyethylene terephthalate membrane.

6. The stab and ballistic resistant material according to claim 5, wherein said biaxially oriented organic membrane is a biaxially oriented polyester membrane.

7. The stab and ballistic resistant material according to claim 6, wherein said biaxially oriented organic membrane has a thickness of $\leq 5$ μm.

8. The stab and ballistic resistant material according to claim 6, wherein said biaxially oriented organic membrane has a longitudinal tensile strength of greater than 200 MPa and a transverse tensile strength of greater than 240 MPa, a longitudinal modulus of greater than 4000 MPa and a transverse modulus of greater than 5000 MPa, and a longitudinal elongation at break of 130% and a transverse elongation at break of 140%.

* * * * *

UNITED STATES PATENT AND TRADEMARK OFFICE
CERTIFICATE OF CORRECTION

| | | |
|---|---|---|
| PATENT NO. | : 8,420,202 B2 | Page 1 of 1 |
| APPLICATION NO. | : 12/811135 | |
| DATED | : April 16, 2013 | |
| INVENTOR(S) | : Nianci Yang et al. | |

It is certified that error appears in the above-identified patent and that said Letters Patent is hereby corrected as shown below:

In the Specification

Col. 8, Line 10
  Delete "a stab"
  Insert --the ballistic--

Signed and Sealed this
Eleventh Day of February, 2014

Michelle K. Lee
*Deputy Director of the United States Patent and Trademark Office*